S. HOUGH.
AUTOMATIC FILLER FOR GREASE CUPS.
APPLICATION FILED SEPT. 22, 1920.

1,422,978.

Patented July 18, 1922.
2 SHEETS—SHEET 1.

INVENTOR
Samuel Hough
By W. W. Williamson Atty.

S. HOUGH.
AUTOMATIC FILLER FOR GREASE CUPS.
APPLICATION FILED SEPT. 22, 1920

1,422,978.

Patented July 18, 1922.
2 SHEETS—SHEET 2.

INVENTOR
Samuel Hough
By W. W. Williamson
Atty.

UNITED STATES PATENT OFFICE.

SAMUEL HOUGH, OF ATCO, NEW JERSEY, ASSIGNOR OF ONE-FOURTH TO RUBEN P. LEVICK, OF BERLIN, NEW JERSEY, AND ONE-FOURTH TO CHARLES J. RICHTER, OF COLLINGSWOOD, NEW JERSEY.

AUTOMATIC FILLER FOR GREASE CUPS.

1,422,978.  Specification of Letters Patent.  Patented July 18, 1922.

Application filed September 22, 1920. Serial No. 411,930.

*To all whom it may concern:*

Be it known that I, SAMUEL HOUGH, a citizen of the United States, residing at Atco, in the county of Camden and State of New Jersey, have invented new and useful Improvements in Automatic Fillers for Grease Cups, of which the following is a specification.

My invention relates to new and useful improvements to automatic fillers for grease cups, and has for its object to provide a simple and unique construction whereby a grease cup may be readily and quickly filled or replenished with lubricant without the necessity of removing the container or the cap closing the same.

A further object of the invention is to provide a grease cup with a transverse or horizontal barrel in which is slidably mounted a valve member adapted to normally close the inlet to and the outlet from said barrel, the latter preferably forming an integral part of the grease cup.

Another object of the invention is to provide a grease cup with a removable cap or top carrying a piston or plunger and guide post in the form of a bolt the head of which is farthest removed from the cap and acts as a stop to limit the inward movement of the piston the latter being normally forced in this direction by a helical spring.

A still further object of the invention is to provide a grease gun nozzle for use in combination with the grease cup, said nozzle having a shoulder for engagement with the walls of the cup in the region of the valve seat for limiting the inward movement of the grease gun nozzle, the latter having an outlet adapted to register with the outlet of the barrel whereby a grease or lubricant may be readily forced into the receptacle of the grease cup for replenishing the same.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Figure 1:
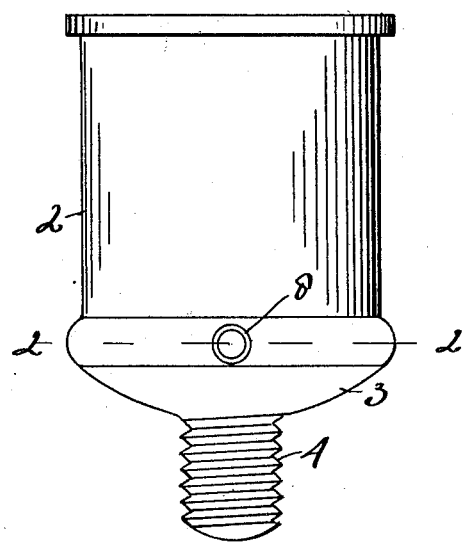
Fig. 1, is a side elevation of a grease cup provided with my automatic refilling mechanism.

In carrying out my invention as here embodied, 2 represents the grease cup receptacle or container preferably formed integral with the base 3 which latter is provided with an externally threaded stem 4 for attachment of the cup to the object to be lubricated and this base member has a transverse horizontal barrel 5, circular in cross section, preferably formed integral as here illustrated, but it is to be understood that I am not limited to this construction as the same might be formed of a separate piece and inserted as will be readily understood.

This barrel 5 provides a valve chamber 6 having an open end 7 and provided at its opposite end with an inlet 8 at the inner end of which is formed a valve seat 9 and this inlet opening is conical or tapered with the greatest diameter at the outside for the reception of and a coaction with a grease gun nozzle as will be hereinafter described.

At some suitable point intermediate the ends of the barrel 5 is an outlet spout 10 having an outlet opening 11 through said spout and the barrel so as to form a communication between the valve chamber 6 and the interior of the grease receptacle 2.

In the valve chamber 6 of the barrel is slidably mounted the valve 12 adapted to close the outlet 11 and provided with a nose 13 for registration with the valve seat 9 to close the inlet opening 8 and this valve 12 is normally forced toward said valve seat by some suitable means such as a spring 14 also located within the valve chamber 6 and having one end engaging the valve 12 as the movable member while the other end rests against a screw or plug 15 as the stationary member, said screw or plug being threaded into the open end of the barrel 5 to normally close said open end.

The reference numeral 16 denotes a cap, cover or top of the grease cup receptacle 2 and this cap is preferably formed of a separate piece and attached to the receptacle in any suitable manner as by threads 17 formed on the cap and receptacle. To this cap is attached a piston or plunger guide post 18 preferably in the form of a bolt having a threaded end 19 for screwing into a threaded central cavity 20 in the cap so that in practice the head 21 of said bolt is farthest removed from the cap and acts as a stop to limit the inward movement of the piston or plunger 22 which is slidably mounted upon said guide post and this piston or plunger is provided with the central lug or collar 23 projecting therefrom and acts as a guide to overcome the possibility of the piston tilting and binding upon the walls of the receptacle during its movements therein.

The piston or plunger is normally forced inward or toward the head 21 of the guide post by suitable means such as a helical spring 24 located within the receptacle and acting upon the piston as the movable member and resting against the cap 16 as the stationary member.

To fill the grease cup I provide a grease gun nozzle 25 which is attached to or carried by the ordinary or well known grease gun of any desirable construction and this nozzle has a frusto-conical shoulder 26 is adapted to register with the tapered inlet opening 8 leading to the valve chamber in the barrel and coacting with the walls of said inlet opening to limit the inward movement of said nozzle so as to stop the same when the outlet opening 27, formed in said nozzle some distance from the end thereof, registers with the outlet opening 11 from the valve chamber, said nozzle under these conditions having forced the valve 12 against the action of this spring 14 away from the valve seat 9 and out of its normal position across the inner end of the outlet opening 11.

In practice a grease cup constructed in the manner herein described may be easily, readily and quickly assembled as the plunger or piston 22 is placed upon the guide post 18 and the spring 24 then placed over said guide post and the latter screwed into the cavity in the cap after which it is only necessary to place the plunger in the receptacle and screw the cap in place for completing the cup assembly. To assemble the automatic refilling mechanism the valve 12 is inserted in the valve chamber 6 followed by the spring 14 and the screw 15 screwed into the open end of the barrel.

Figure 2:
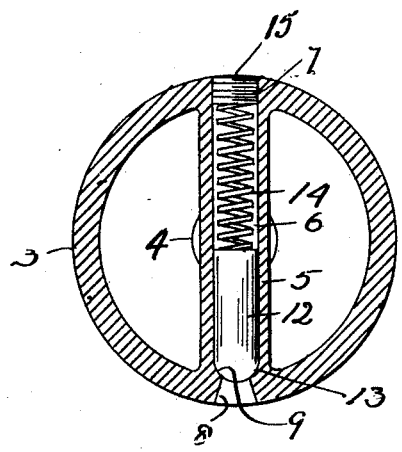
Fig. 2, is a horizontal section thereof on the line 2—2 of Fig. 1.
Figure 3:
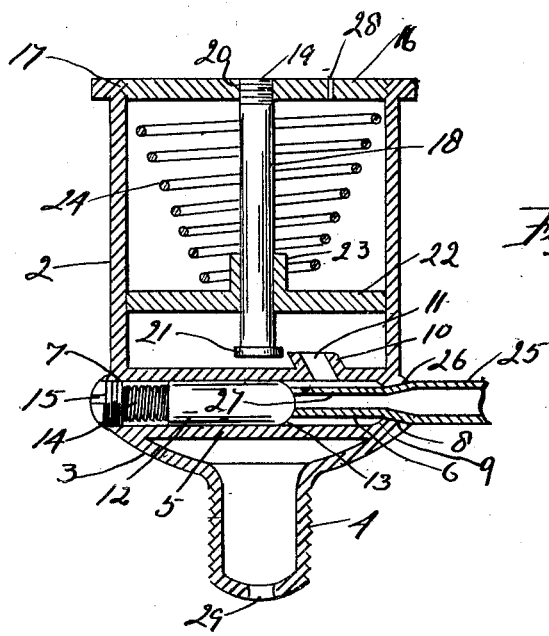
Fig. 3, is a vertical sectional view thereof.
Figure 4:
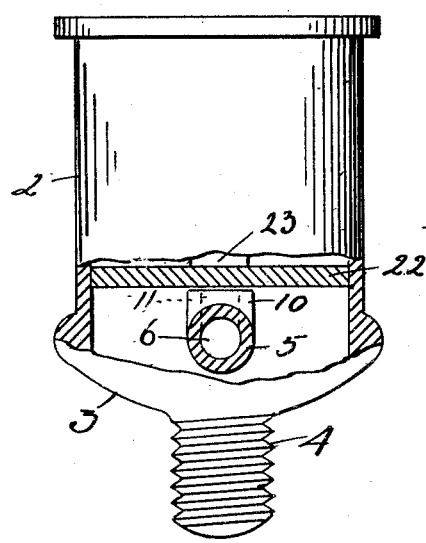
Fig. 4, is a side elevation thereof, a portion being broken away and shown in section at right angles to Fig. 3 to illustrate the preferred form of barrel and the relation of the plunger thereto at the end of its inward stroke.

The operation of the device is as follows:

The plunger being at its innermost or lowermost position as shown in Fig. 4 and the valve in its closed position as shown in Fig. 2, the nozzle of the grease gun is brought into registration with the inlet opening 8 leading to the valve chamber 6 and caused to engage the nose of the valve 12, then by slight pressure against the action of the spring 14 said nozzle may be forced into the valve chamber 6 which will move the valve 12 away from its seat 9 and uncover the outlet opening 11 and when the frusto-conical shoulder 26 on said grease gun nozzle engages the tapered inlet opening 8 the inward movement of said nozzle will be stopped and when in this position the outlet opening 27 from the grease gun nozzle will align with or be in the region of the outlet opening 11, then by forcing the lubricant contained within the grease gun therefrom in any well known manner through the nozzle 25 said lubricant will be forced into the grease cup and the pressure in back of the grease or lubricant as it issues from the nozzle will force the plunger or piston 22 outward or upward against the action of the spring 24 until the receptacle is completely filled or contains the amount of grease desired after which the grease gun nozzle is quickly withdrawn from the valve chamber allowing the spring 14 to quickly return the valve 12 to its seat 9 and during its return movement it slides across the outlet opening 11 so as to effectually close the same thereby preventing the expulsion of any grease from the receptacle 2 into the valve chamber. During the forcing of the lubricant into the receptacle any air within said receptacle between the plunger or piston 22 and the cap 16 is permitted to escape through the vent opening 28 formed in the cap.

As soon as the pressure on the grease is removed by the withdrawal of the grease gun 9 the spring 24 is permitted to act which will provide sufficient pressure to gradually force the piston 22 inward or downward to force the lubricant from the receptacle through the feeding opening 29 in the stem 4 to the object or parts to be lubricated.

Of course I do not wish to be limited to the exact details of construction as herein shown as these may be varied within the limits of the appended claims without departing from the spirit of my invention.

Having thus fully described my invention, what I claim as new and useful is:—

1. In a device of the character stated, a base provided with a stem having a lubricant outlet, a barrel formed integral with said base and disposed transversely thereof, said barrel being open at one end and having a valve chamber therein with an inlet opening leading thereto at the opposite end and further having an outlet opening leading therefrom intermediate its ends, a valve seat surrounding the inlet opening, a valve slidably mounted within the chamber adapted to be disposed across the outlet opening for closing the same and adapted to engage the seat for closing the inlet opening, a spring for normally forcing said valve toward its seat, a screw threaded in the open end of the barrel for normally closing said open end and acting as a backer for the spring.

2. In a device of the character stated, a base provided with a stem having a lubricant outlet, a barrel formed integral with said base and disposed transversely thereof, said barrel being open at one end and having a valve chamber therein with an inlet opening leading thereto at the opposite end and further having an outlet opening leading therefrom intermediate its ends, a valve seat surrounding the inlet opening, a valve slidably mounted within the chamber adapted to be disposed across the outlet opening for closing the same and adapted to engage the seat for closing the inlet opening, a spring for normally forcing said valve toward its slot, a screw threaded in the open end of the barrel for normally closing said open end and acting as a backer for the spring, a grease receptacle carried by the base, a cap having a vent opening therein and provided with a threaded cavity, said cap being carried by the grease receptacle, a guide post mounted in said threaded cavity, a head on the opposite end of said post, a plunger or piston slidably mounted upon the post, and a spring located between the cap and piston for normally forcing the latter toward the head of the post whereby grease may be expelled from the receptacle.

3. In a device of the character described, a grease cup provided with an interior barrel having a valve chamber therein provided with a tapered inlet opening forming a communication between the exterior of the cup and said valve chamber and further having an outlet opening forming a communication between the valve chamber and the interior of the cup, a spring actuated valve for normally closing said openings, in combination with a grease gun nozzle having a frustoconical shoulder some distance from its end and adapted to register with the conical inlet opening to limit the inward movement of said nozzle having an outlet opening adjacent its end for registration with the outlet opening leading from the valve chamber when said nozzle is inserted therein and during which time the valve will be forced away from the openings by said nozzle.

4. In a device of the character stated, a base having a stem provided with a lubricant outlet and a barrel within said base to form a valve casing and act as a lubricant inlet, said barrel being disposed transversely of the base and forming a passageway on each side of the barrel, said passageways communicating with the lubricant outlet, as shown.

5. In a device of the character stated, a base having a stem provided with a lubricating outlet, a barrel within said base, disposed transversely thereof and forming a passageway on each side of the barrel, said passageways communicating with the lubricant outlet, said barrel having an inlet, an outlet passageway projecting from said barrel and having an outlet passageway therethrough and a valve controlling said inlet and outlet.

6. In a device of the character described, a grease cup provided with an interior barrel having a valve chamber and provided with a tapered inlet opening, the larger end of said inlet opening being at the outer face of the grease cup for the purpose stated.

7. A device of the character described comprising a grease receptacle, a cap carried thereby, a guide post fixed to the cap, a spring actuated piston slidable on said post, and a head on the free end of said post for limiting the movement of the piston in one direction.

8. A device of the character described comprising a grease receptacle, a cap carried thereby, a guide post fixed to the cap, a piston slidable on said post and a spring for forcing said piston in one direction, said piston being moved in the other direction and against the action of the spring by a lubricant forced into the receptacle, the cap having a vent opening therethrough to permit the escape of air during the filling of the receptacle.

In testimony whereof, I have hereunto affixed my signature.

SAMUEL HOUGH.